(12) United States Patent  
Yi

(10) Patent No.: US 9,374,779 B2
(45) Date of Patent: Jun. 21, 2016

(54) METHOD AND APPARATUS FOR REDUCING TRANSMIT POWER

(71) Applicant: Huawei Technologies Co., Ltd., Shenzhen (CN)

(72) Inventor: Xiongshu Yi, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/664,555

(22) Filed: Mar. 20, 2015

(65) Prior Publication Data

US 2015/0195781 A1 Jul. 9, 2015

Related U.S. Application Data

(63) Continuation of application No. PCT/CN2013/076930, filed on Jun. 7, 2013.

(30) Foreign Application Priority Data

Sep. 21, 2012 (CN) .......................... 2012 1 0355336

(51) Int. Cl.
*H04W 72/00* (2009.01)
*H04W 52/02* (2009.01)
(Continued)

(52) U.S. Cl.
CPC .......... *H04W 52/0206* (2013.01); *H04W 52/04* (2013.01); *H04W 52/143* (2013.01); *H04W 52/265* (2013.01); *H04W 52/267* (2013.01); *H04W 52/346* (2013.01); *H04W 72/121* (2013.01); *H04W 72/1236* (2013.01); *Y02B 60/50* (2013.01)

(58) Field of Classification Search
CPC .......... H04W 52/0206; H04W 52/267; H04W 52/143; H04W 52/346; H04W 72/1236; H04W 72/121; H04W 52/04; Y02B 60/50
USPC ............................ 455/452.2, 452.1, 450–454
See application file for complete search history.

(56) References Cited

U.S. PATENT DOCUMENTS 7,039,706 B1   5/2006   Parker et al.
7,126,996 B2   10/2006  Classon et al.
(Continued)

FOREIGN PATENT DOCUMENTS

CN    1787682 A    6/2006
CN    101998596 A  3/2011
(Continued)

*Primary Examiner* — Shahriar Behnamian
(74) *Attorney, Agent, or Firm* — Slater Matsil, LLP

(57) ABSTRACT

Embodiments of the present invention relate to a method and an apparatus for reducing transmit power. The method includes allocating initial bandwidth to all terminals scheduled in a current timeslot in a cell; calculating remaining bandwidth in the current timeslot and remaining system bandwidth; if the remaining system bandwidth is greater than preset threshold bandwidth, reducing transmit power or a frequency domain to calculate expanded bandwidth; calculating a transmit power reduction value corresponding to the terminal in a current scheduling timeslot, and a time domain system power reduction value, or a final frequency domain system power reduction value of each terminal; when the time domain system power reduction value is not less than a preset threshold, or when a final frequency domain transmit power reduction value of each terminal is not less than a preset threshold, reducing transmit power of a base station.

20 Claims, 2 Drawing Sheets

(51) Int. Cl.
  *H04W 52/04* (2009.01)
  *H04W 72/12* (2009.01)
  *H04W 52/14* (2009.01)
  *H04W 52/34* (2009.01)
  *H04W 52/26* (2009.01)

(56) References Cited

U.S. PATENT DOCUMENTS

| | | |
|---|---|---|
| 7,289,494 B2 | 10/2007 | Lakkis |
| 7,672,384 B2 | 3/2010 | Giannakis et al. |
| 8,103,302 B2 | 1/2012 | Haartsen et al. |
| 8,238,453 B1 | 8/2012 | Lou et al. |
| 8,498,652 B2 * | 7/2013 | Norlund ............ H04W 52/0222 370/329 |
| 2002/0006157 A1 | 1/2002 | Hunton |
| 2011/0176497 A1 * | 7/2011 | Gopalakrishnan .. H04J 11/0053 370/329 |

FOREIGN PATENT DOCUMENTS

| | | |
|---|---|---|
| CN | 102348267 A | 2/2012 |
| WO | 2007104341 A1 | 9/2007 |

* cited by examiner

METHOD AND APPARATUS FOR REDUCING TRANSMIT POWER

This application is a continuation of International Application No. PCT/CN2013/076930 filed on Jun. 7, 2013 which claims priority to Chinese Patent Application No. 201210355336.0, filed on Sep. 21, 2012 both of which are hereby incorporated by reference in their entireties.

TECHNICAL FIELD

The present invention relates to the field of communications technologies, and in particular, to a method and an apparatus for reducing transmit power.

BACKGROUND

With the development of communications technologies, green communications has become a trend. How to reduce transmit power of a base station without affecting system performance has great significance for operators to reduce operating costs.

A channel capacity formula commonly used in communications technologies is expressed as formula (1).

$$C = B \cdot \log_2(1+SINR) \qquad \text{Formula (1)}$$

where C is a channel capacity, B is bandwidth, and SINR is a signal to interference plus noise ratio. SINR is short for Signal to Interference plus Noise Ratio, and in an environment with no interference, a signal to noise ratio SNR (Signal to Noise Ratio) may be used to replace the signal to interference plus noise ratio SINR.

Bandwidth is expanded to x times the bandwidth in a situation of same transmit power, as expressed by formula (2). The channel capacity may also increase accordingly. Therefore, if there is idle bandwidth, bandwidth scheduling and expansion may be used to reduce transmit power.

$$C = x \cdot B \cdot \log_2\left(1 + \frac{SINR}{x}\right) \qquad \text{Formula (2)}$$

In the prior art, for long term evolution (LTE) terminals or other wireless communications devices, a method for reducing transmit power of a terminal by using bandwidth expansion is: first determining, by a terminal side, a requirement of a data transmission throughput of a mobile terminal and path loss information of data transmission; selecting a combined transmission parameter for bandwidth expansion based on the requirement of the throughput and the path loss information; and readjusting transmit power of the terminal, so as to reduce the transmit power of the terminal. In this process, a behavior of a base station is cooperating with the terminal side.

However, by using the foregoing bandwidth expansion manner, only the transmit power of the terminal is reduced, and transmit power of a base station side is not affected.

SUMMARY

Embodiments of the present invention provide a method and an apparatus for reducing transmit power, so as to solve a problem in the prior art that only transmit power of a terminal is reduced, but transmit power of a base station side is not affected. Remaining system bandwidth is calculated according to initial bandwidth allocated to each user terminal; after the remaining system bandwidth is greater than preset threshold bandwidth, expanded bandwidth allocated to each user terminal is calculated in a time domain or a frequency domain, where the expanded bandwidth is greater than or equal to the initial bandwidth, thereby greatly reducing transmit power of a base station.

According to a first aspect, the present invention provides a method for reducing transmit power, where the method includes: allocating, according to at least one type of information among quality of service QoS information of a user, historical scheduling information, and channel quality information, initial bandwidth to all terminals scheduled in a current timeslot in a cell; calculating remaining bandwidth in the current timeslot according to the initial bandwidth of all the terminals scheduled in the current timeslot, and obtaining remaining system bandwidth according to the remaining bandwidth in the current timeslot, or after statistics processing is performed on the remaining bandwidth in the current timeslot and remaining bandwidth in a historical timeslot; if the remaining system bandwidth is greater than preset threshold bandwidth, reducing transmit power based on a time domain or a frequency domain to calculate expanded bandwidth of each terminal scheduled in the current timeslot; calculating, according to initial bandwidth and the expanded bandwidth of each terminal scheduled in the current timeslot and a linear fitting function and based on the time domain or the frequency domain, a transmit power reduction value corresponding to each terminal in a current scheduling timeslot after each terminal has undergone bandwidth expansion, and obtaining a time domain system power reduction value, or a final frequency domain system power reduction value of each terminal according to the transmit power reduction value in the current scheduling timeslot or according to a result of statistics processing performed on the transmit power reduction value in the current scheduling timeslot and a transmit power reduction value in a historical scheduling timeslot; and when the time domain system power reduction value is not less than a preset threshold, reducing transmit power of a base station based on the time domain; or when a final frequency domain transmit power reduction value of each terminal is not less than a preset threshold, reducing transmit power of a base station based on the frequency domain.

In a first possible implementation manner of the first aspect, the reducing transmit power based on a time domain to calculate expanded bandwidth of the terminal is specifically: calculating, according to spectrum efficiency of a terminal, a linear fitting function formed by spectrum efficiency and a signal to interference plus noise ratio or formed by spectrum efficiency and a signal to noise ratio, and a constraint function formed by that a sum of expanded bandwidth of all the terminals scheduled in the current timeslot is equal to γ times the system bandwidth, a bandwidth expansion coefficient of each terminal scheduled in the current timeslot, where a value of γ is greater than 0 and not greater than 1; and calculating the expanded bandwidth of the terminal according to the bandwidth expansion coefficient of the terminal.

In a second possible implementation manner of the first aspect, the reducing transmit power based on a frequency domain to calculate expanded bandwidth of the terminal is specifically: calculating, according to the initial bandwidth of the terminal and a modulation and coding scheme of the terminal, or according to the initial bandwidth and spectrum efficiency of the terminal, additional bandwidth to be allocated to each terminal scheduled in the current timeslot; calculating, according to the additional bandwidth of the terminal scheduled in the current timeslot, the expanded bandwidth of each terminal scheduled in the current timeslot; and calculating a bandwidth expansion coefficient of each terminal according to the initial bandwidth and the expanded bandwidth of each terminal scheduled in the current timeslot.

In a third possible implementation manner of the first aspect, the calculating expanded bandwidth of the terminal in the frequency domain is specifically: calculating a proportionality coefficient of the initial bandwidth of each terminal scheduled in the current timeslot to the system bandwidth according to the initial bandwidth of each terminal scheduled in the current timeslot; forming, according to the proportionality coefficient of the initial bandwidth of each terminal scheduled in the current timeslot to the system bandwidth, spectrum efficiency of the terminal, and spectrum efficiency and a signal to interference plus noise ratio (or a signal to noise ratio), a cost function for a sum of reduced transmit power of the terminal scheduled in the current timeslot; calculating, according to the cost function of the terminal, a linear fitting function formed by the spectrum efficiency of the terminal and a signal to interference plus noise ratio, and a constraint function that a sum of expanded bandwidth of the terminals is equal to the system bandwidth, a bandwidth expansion coefficient of the terminal; and calculating the expanded bandwidth according to the bandwidth expansion coefficient of the terminal.

According to a second aspect, the present invention provides an apparatus for reducing transmit power, where the apparatus includes: a first allocator, configured to allocate, according to at least one type of information among quality of service QoS information of a user, historical scheduling information, and channel quality information, initial bandwidth to all terminals scheduled in a current timeslot in a cell, and transmit the initial bandwidth to a first calculator; the first calculator, configured to receive the initial bandwidth from the first allocator, calculate remaining bandwidth in the current timeslot according to initial bandwidth of all the terminals scheduled in the current timeslot, obtain remaining system bandwidth according to the remaining bandwidth in the current timeslot, or after statistics processing is performed on the remaining bandwidth in the current timeslot and remaining bandwidth in a historical timeslot, and transmit the remaining system bandwidth to the second calculator; the second calculator, configured to receive the remaining system bandwidth from the first calculator, and if the remaining system bandwidth is greater than preset threshold bandwidth, reduce transmit power based on a time domain or a frequency domain to calculate expanded bandwidth of the terminal, and transmit the expanded bandwidth to a third calculator; the third calculator, configured to calculate, according to initial bandwidth and the expanded bandwidth of each terminal scheduled in the current timeslot and a linear fitting function and based on the time domain or the frequency domain, a transmit power reduction value corresponding to each terminal in a current scheduling timeslot after each terminal has undergone bandwidth expansion, obtain a time domain system power reduction value, or a final frequency domain system power reduction value of each terminal according to the transmit power reduction value in the current scheduling timeslot or according to a result of statistics processing performed on the transmit power reduction value in the current scheduling timeslot and a transmit power reduction value of a historical scheduling timeslot, and transmit the time domain system power reduction value, or the final frequency domain system power reduction value of each terminal to a processor; and the processor, configured to receive the final frequency domain system power reduction value of each terminal from the third calculator, when the time domain system power reduction value is not less than a preset threshold, reduce transmit power of a base station based on the time domain, or when a final frequency domain transmit power reduction value of each terminal is not less than a preset threshold, reduce the transmit power of the base station based on the frequency domain, and allocate the expanded bandwidth to the terminal.

In a first possible implementation manner of the second aspect, the second calculator is specifically configured to calculate, according to spectrum efficiency of a terminal, a linear fitting function formed by spectrum efficiency and a signal to interference plus noise ratio or formed by spectrum efficiency and a signal to noise ratio, and a constraint function formed by that a sum of expanded bandwidth of all the terminals scheduled in the current timeslot is equal to γ times the system bandwidth, a bandwidth expansion coefficient of each terminal scheduled in the current timeslot, where γ is greater than 0 and not greater than 1; and calculate the expanded bandwidth according to the bandwidth expansion coefficient of the terminal; or calculate a bandwidth expansion coefficient of the terminal according to the initial bandwidth and the expanded bandwidth of each terminal scheduled in the current timeslot.

In a second possible implementation manner of the second aspect, the second calculator is specifically configured to calculate, according to the initial bandwidth of the terminal and a modulation and coding scheme of the terminal, or according to the initial bandwidth and spectrum efficiency of the terminal, additional bandwidth to be allocated to the terminal; calculate the expanded bandwidth according to the additional bandwidth; and calculate a bandwidth expansion coefficient of each terminal according to the initial bandwidth and the expanded bandwidth of each terminal scheduled in the current timeslot.

In a third possible implementation manner of the second aspect, the second calculator is specifically configured to calculate a proportionality coefficient of the initial bandwidth to the system bandwidth according to the initial bandwidth; form a cost function of the terminal according to the proportionality coefficient of the initial bandwidth to the system bandwidth, spectrum efficiency of the terminal, and a signal to interference plus noise ratio; calculate a bandwidth expansion coefficient of the terminal according to the cost function of the terminal, a linear fitting function formed by the spectrum efficiency of the terminal and a signal to interference plus noise ratio, and a constraint function that a sum of expanded bandwidth of the terminals is equal to the system bandwidth; and calculate the expanded bandwidth according to the bandwidth expansion coefficient of the terminal.

Therefore, in the method and the apparatus for reducing transmit power that are disclosed in the embodiments of the present invention, initial bandwidth is allocated to a terminal according to quality of service requirement information of a user and channel quality indication information, and then remaining system bandwidth is calculated; when the remaining system bandwidth is greater than preset threshold bandwidth, expanded bandwidth of each user terminal is calculated in a time domain or a frequency domain, where the calculated expanded bandwidth, namely, expanded bandwidth of the terminal, is greater than or equal to the initial bandwidth; finally, the expanded bandwidth is allocated to each user terminal, thereby reducing transmit power of a base station in a bandwidth expansion manner.

DETAILED DESCRIPTION OF ILLUSTRATIVE EMBODIMENTS

The following further describes in detail the technical solutions of the present invention with reference to the accompanying drawings and the embodiments.

In a method and an apparatus for reducing transmit power that are disclosed in embodiments of the present invention, initial bandwidth is allocated to each user terminal according to quality of service requirement information of a user and channel quality indication information; and then remaining system bandwidth is calculated; when the remaining system bandwidth is greater than preset threshold bandwidth, expanded bandwidth of each user terminal is calculated in a time domain or a frequency domain by using three calculation methods, where the calculated expanded bandwidth, namely, expanded bandwidth, is greater than or equal to the initial bandwidth; and finally, the expanded bandwidth is allocated to each user terminal, thereby greatly reducing transmit power of a base station in a bandwidth expansion manner.

Figure 1:
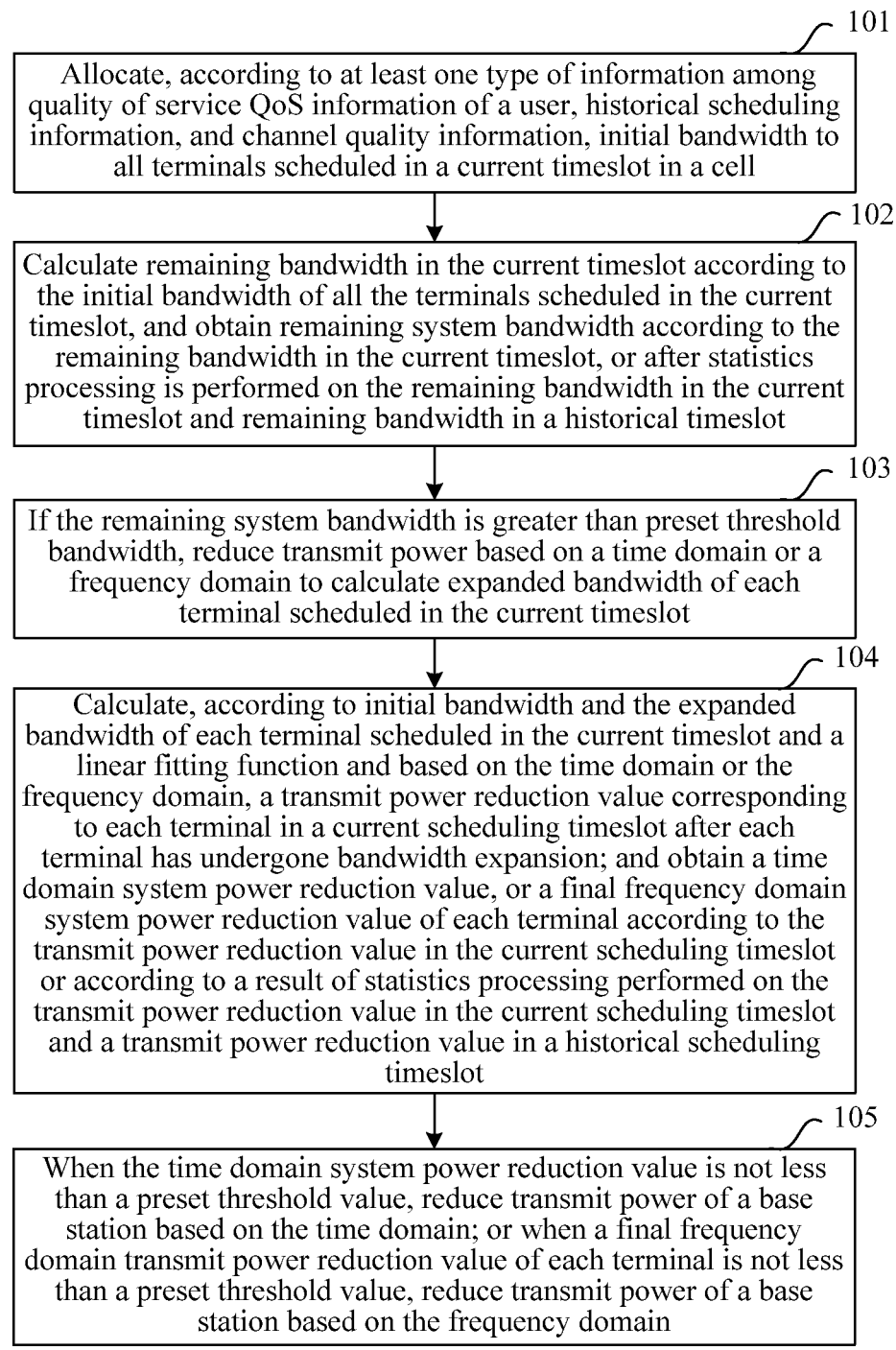
FIG. 1 is a flowchart of a method for reducing transmit power according to a first embodiment of the present invention.

FIG. 1 is a flowchart of a method for reducing transmit power according to a first embodiment of the present invention. As shown in the figure, this embodiment specifically includes the following steps.

Step 101: Allocate, according to at least one type of information among quality of service QoS (QoS) information of a user, historical scheduling information, and channel quality information, initial bandwidth to all terminals scheduled in a current timeslot in a cell.

Specifically, in this embodiment, k user terminals are used to describe a procedure of reducing transmit power by means of bandwidth expansion. User QoS includes rate information of a user, quality of service class identifier (QCI) information of a user, time delay information, and the like. A base station obtains CQI information from a terminal, where information about a modulation and coding scheme (MCS) may be deduced, and the MCS information may be mapped to information about a signal to interference plus noise ratio (SINR). As shown in Table 1, there is a one-to-one correspondence between a MCS order and spectrum efficiency (SE). When the base station allocates initial bandwidth to each user terminal, that is, during initial scheduling, information such as MCS information, the number of resource blocks (RB) scheduled for each user terminal, and a position of an RB. In a time domain, an RB is multiple OFDM symbols or SC-FDMA symbols; in a frequency domain, an RB is multiple subcarriers. In this embodiment of the present invention, a demodulation threshold SINR is defined as a signal to interference plus noise ratio or a signal to noise ratio needed when an initial block error rate (IBLER) is x%, where a unit is dB, and $0.0 < x < 100.0$.

TABLE 1

| MCS Order | Modulation Order | Demodulation Threshold SINR (dB) | Spectrum Efficiency (bps/Hz) |
|---|---|---|---|
| 0 | QPSK | −4 | 0.2 |
| 1 | QPSK | 2 | 0.4 |
| 2 | QPSK | 6 | 1.2 |
| 3 | 16QAM | 10 | 1.8 |
| 4 | 16QAM | 12 | 2.5 |
| 5 | 16QAM | 17 | 3.4 |
| 6 | 64QAM | 20 | 4.0 |

TABLE 1-continued

| MCS Order | Modulation Order | Demodulation Threshold SINR (dB) | Spectrum Efficiency (bps/Hz) |
|---|---|---|---|
| 7 | 64QAM | 24 | 4.7 |
| 8 | 64QAM | 28 | 5.6 |

Step 102: Calculate remaining system bandwidth according to the initial bandwidth of all terminals scheduled in the current timeslot, and obtain remaining system bandwidth according to the remaining bandwidth in the current timeslot, or after statistics processing is performed on the remaining bandwidth in the current timeslot and remaining bandwidth in a historical timeslot.

Specifically, in a system in which a subcarrier group is used as a resource allocation unit, for example, in an LTE system, downlink system bandwidth is denoted by $\overline{N}_{sys}^{RB}$, and corrected system bandwidth is denoted by $N_{sys}^{RB} = \gamma \cdot \overline{N}_{sys}^{RB}$, where $0.0 < \gamma \le 1.0$, and the system bandwidth is in unit of RB. Initial bandwidth allocated to each user terminal is denoted by $RB_{i,pre}$, where i represents an $i^{th}$ user terminal. For example, $RB_{1,pre}$ is initial bandwidth allocated to a first user terminal, $RB_{i,pre}$ is initial bandwidth allocated to the $i^{th}$ user terminal, and by analogy, $RB_{k,pre}$ is initial bandwidth allocated to a $k^{th}$ user terminal.

A process of calculating the remaining system bandwidth according to the initial bandwidth allocated to each user terminal is as follows.

Firstly, a sum $$\sum_{i=1}^{k} RB_{i,pre}$$

of the initial bandwidth allocated to all the user terminals is calculated, as expressed by formula (3).

$$\sum_{i=1}^{k} RB_{i,pre} = RB_{1,pre} + \ldots + RB_{i,pre} + \ldots RB_{k,pre} \quad \text{Formula (3)}$$

Secondly, the sum of the initial bandwidth allocated to all the user terminals is subtracted from system bandwidth, so as to obtain remaining bandwidth $N_{sys}^{RB}$, as expressed by formula (4-2).

$$N_{left}^{RB} = N_{sys}^{RB} - \sum_{i=1}^{k} RB_{i,pre} \quad \text{Formula (4-1)}$$

$$N_{sur}^{RB} = N_{left}^{RB} \quad \text{Formula (4-2)}$$

$N_{sur}^{RB}$ is remaining system bandwidth.

In addition, manners such as alpha filtering, kalman filtering, and moving average filtering may also be used to perform statistics on remaining bandwidth. For example, alpha filtering is used, and then a process of calculating remaining bandwidth is expressed by formula (5), formula (6-1), and formula (6-2).

$$\hat{N}_{Left}^{RB}(0) = N_{Left}^{RB}(0) \quad \text{Formula (5)}$$

$$\hat{N}_{Left}^{RB}(i) = \alpha \cdot N_{Left}^{RB}(i) + (1-\alpha) \cdot \hat{N}_{Left}^{RB}(i-1) \quad \text{Formula (6-1)}$$

$$N_{sur}^{RB} = \hat{N}_{Left}^{RB}(i) \quad \text{Formula (6-2)}$$

$N_{Left}^{RB}(0)$ is remaining bandwidth after first timeslot scheduling, $\hat{N}_{Left}^{RB}(i)$ is remaining bandwidth after i+1$^{th}$ timeslot scheduling, α is an alpha filtering coefficient, and a value range of the alpha filtering coefficient is between 0 and 1, that is, 0<α≤1. i is i+1$^{th}$ timeslot scheduling, and a unit timeslot for scheduling may be a subframe defined in the LTE system, namely, time of 1 ms. Remaining bandwidth obtained after i+1$^{th}$ scheduling is $\hat{N}_{Left}^{RB}(i)$, and final remaining bandwidth is counted as $N_{sur}^{RB}$.

Step 103: When the remaining system bandwidth $N_{sur}^{RB}$ is greater than preset threshold bandwidth, reduce transmit power based on a time domain or a frequency domain to calculate expanded bandwidth of each terminal scheduled in the current timeslot, where the calculated expanded bandwidth is greater than or equal to the initial bandwidth.

Specifically, when the remaining bandwidth $N_{sur}^{RB}$ is greater than preset threshold bandwidth $N_P^{RB}$, it indicates that there is idle bandwidth. To reduce transmit power of a base station, a bandwidth expansion manner may be used to reduce the transmit power, so as to calculate expanded bandwidth of each user terminal in the time domain or the frequency domain, where the preset threshold bandwidth $N_P^{RB}$ is set according to an actual condition.

There are three methods for calculating the expanded bandwidth of each user terminal, and the methods are specifically as follows.

A first method is a process of reducing transmit power based on a time domain to calculate the expanded bandwidth of each user terminal. The process is used in a scenario in which system transmit power is reduced in the time domain; for example, power reduction is completed in a baseband time domain signal, a time domain signal in a digital intermediate frequency domain, or a radio frequency power amplifier.

Step a: Calculate, according to current spectrum efficiency of a user, a linear fitting function formed by spectrum efficiency and a signal to interference plus noise ratio or formed by spectrum efficiency and a signal to noise ratio, and a constraint function formed by that a sum of expanded bandwidth of all terminals scheduled in the current timeslot is equal to γ times the system bandwidth, a bandwidth expansion coefficient of each user terminal, where a value of γ ranges between 0.0 and 1.0, and may also be equal to 1.0. After expanded bandwidth, as expressed by formula (8), and reduced transmit power of each user terminal is the same, that is, a demodulation threshold SINR or SNR is reduced by a same value of dB.

Specifically, linear fitting is performed by using spectrum efficiency and a demodulation threshold SINR to obtain a linear fitting formula, that is, a linear fitting function, as expressed by formula (7).

$$y = a \cdot x + b \quad \text{Formula (7)}$$

y denotes a demodulation threshold SINR, in a unit of dB, corresponding to spectrum efficiency SE; a denotes a slope of linear fitting, x denotes spectrum efficiency SE in a unit of bps/Hz, and b is a value of a linear fitting line when x=0.

Because a power reduction operation is performed at an intermediate radio frequency, different users cannot be differentiated in the time domain, and it is required to ensure that demodulation thresholds X reduced by means of bandwidth expansion are the same for all users, as expressed by formula (8).

$$\begin{aligned} X &= SINR(SE_{PreRB}^1) - SINR(SE_{PosRB}^1) \\ &= SINR(SE_{PreRB}^2) - SINR(SE_{PosRB}^2) \\ &= \ldots \\ &= SINR(SE_{PreRB}^k) - SINR(SE_{PosRB}^k) \end{aligned} \quad \text{Formula (8)}$$

$SE_{PreRB}^1$ denotes spectrum efficiency of a first user terminal before bandwidth expansion is performed, and $SE_{PosRB}^1$ denotes spectrum efficiency of the first user terminal after bandwidth expansion is performed; by analogy, $SE_{PreRB}^k$ denotes spectrum efficiency of a k$^{th}$ user terminal before bandwidth expansion is performed, and $SE_{PosRB}^k$ denotes spectrum efficiency of the k$^{th}$ user terminal after bandwidth expansion is performed. $SINR(SE_{PreRB}^1)$ denotes a demodulation threshold corresponding to the spectrum efficiency of the first user terminal before bandwidth expansion is performed, where SINR corresponds to y in formula (7), $SE_{PreRB}^1$ corresponds to x in formula (7), and SINR($SE_{PreRB}^1$) denotes that an independent variable is $SE_{PreRB}^1$ and a dependent variable is SINR. $SINR(SE_{PosRB}^1)$ denotes a demodulation threshold corresponding to the spectrum efficiency of the first user terminal after bandwidth expansion is performed; by analogy, $SINR(SE_{PreRB}^k)$ denotes a demodulation threshold corresponding to the spectrum efficiency of the k$^{th}$ user terminal before bandwidth expansion is performed, and $SINR(SE_{PosRB}^k)$ denotes a demodulation threshold corresponding to the spectrum efficiency of the k$^{th}$ user terminal after bandwidth expansion is performed. X is a difference between the demodulation threshold corresponding to the spectrum efficiency of the k$^{th}$ user terminal before bandwidth expansion is performed and the demodulation threshold corresponding to the spectrum efficiency of the k$^{th}$ user terminal after bandwidth expansion is performed.

In this embodiment of the present invention, it is defined that $\alpha_i$ denotes a bandwidth expansion coefficient of the i$^{th}$ user, where a value of $\alpha_i$ ranges between 0 and 1, that is, 0<$\alpha_i$≤1. $SE_{PreRB}^i$ denotes spectrum efficiency of the i$^{th}$ user terminal before bandwidth expansion is performed, and $SE_{PosRB}^i$ denotes spectrum efficiency of the i$^{th}$ user terminal after bandwidth expansion is performed. A relationship between the spectrum efficiency of the i$^{th}$ user terminal before bandwidth expansion is performed and the spectrum efficiency of the i$^{th}$ user terminal after bandwidth expansion is performed is expressed by formula (9), where spectrum efficiency decreases after bandwidth expansion, because if same data is transmitted, more frequency domain resources, namely, more resource blocks are needed.

$$SE_{PosRB}^i = \alpha_i \cdot SE_{PreRB}^i \quad \text{Formula (9)}$$

Formula (9) is substituted into formula (8), so as to obtain formula (10).

$$\begin{aligned} X &= SINR(SE_{PreRB}^1) - SINR\left(\frac{1}{\alpha_1} \cdot SE_{PreRB}^1\right) \\ &= SINR(SE_{PreRB}^2) - SINR\left(\frac{1}{\alpha_2} \cdot SE_{PreRB}^2\right) \\ &= \ldots \\ &= SINR(SE_{PreRB}^k) - SINR\left(\frac{1}{\alpha_K} \cdot SE_{PreRB}^k\right) \end{aligned} \quad \text{Formula (10)}$$

Formula (7) is substituted into formula (10), so as to obtain formula (11), where SINR in formula (10) is y in formula (7), and $SE_{PreRB}$ is x in formula (7). $SE_{PreRB}^1$ is $x_1$ in formula (7), $SE_{PreRB}^2$ is $x_2$ in formula (7), ..., and $SE_{PreRB}^k$ is $x_k$ in formula (7).

$$a \cdot \left(1 - \frac{1}{\alpha_1}\right) \cdot x_1 = a \cdot \left(1 - \frac{1}{\alpha_2}\right) \cdot x_2 = \ldots = a \cdot \left(1 - \frac{1}{\alpha_k}\right) \cdot x_k \quad \text{Formula (11)}$$

A formula of a relationship between $\alpha_i$ and $\alpha_1$ is obtained by further solving formula (11), as expressed by formula (12).

$$\frac{1}{\alpha_i} = \left(1 - \frac{x_1}{x_i}\right) + \frac{x_1}{\alpha_1 x_i} \quad \text{Formula (12)}$$

$x_1$ is the spectrum efficiency of the first user terminal before bandwidth expansion is performed, $\alpha_1$ is a bandwidth expansion coefficient of the first user terminal, $x_i$ is the spectrum efficiency of the $i^{th}$ user terminal before bandwidth expansion is performed, and $\alpha_1$ is a bandwidth expansion coefficient of the $i^{th}$ user terminal.

Finally, a constraint function of the system bandwidth is used, where the constraint function is specifically as follows. A sum of expanded bandwidth of all the terminals in a current scheduling timeslot in a cell is equal to the system bandwidth, as expressed by formula (13-1). In addition, when the constraint function is denoted by using initial bandwidth of all the terminals in the current scheduling timeslot in the cell, as expressed by formula (13-2), $\alpha_1$ may be obtained by substituting formula (12) into formula (13-2), and a bandwidth expansion coefficient $\alpha_i$ of each user is obtained by using a similar method.

$$RB_{1,pos} + RB_{2,pos} + \ldots + RB_{k,pos} = N_{sys}^{RB} \quad \text{Formula (13-1)}$$

$$\frac{1}{\alpha_1} \cdot RB_{1,pre} + \frac{1}{\alpha_2} \cdot RB_{2,pre} + \ldots + \frac{1}{\alpha_k} RB_{k,pre} = N_{sys}^{RB} \quad \text{Formula (13-2)}$$

$N_{sys}^{RB}$ is system bandwidth, $RB_{1,pre}$ is initial bandwidth allocated to the first user terminal, $RB_{i,pre}$ is initial bandwidth allocated to the $i^{th}$ user terminal, and by analogy, $RB_{k,pre}$ is initial bandwidth allocated to the $k^{th}$ user terminal; $RB_{1,pos}$ is expanded bandwidth allocated to the first user terminal, $RB_{2,pos}$ is expanded bandwidth allocated to the $i^{th}$ user terminal, and by analogy, $RB_{k,pos}$ is expanded bandwidth allocated to the $k^{th}$ user terminal.

Step b: Calculate expanded bandwidth of each user terminal according to the bandwidth expansion coefficient of each user terminal.

Specifically, if there are k user terminals, the expanded bandwidth of all user terminal is specifically $RB_{i,pos}$, $RB_{2,pos}$, ..., $RB_{k,pos}$, and the like, where calculation processes thereof are respectively expressed by formula (14), formula (15), and formula (16).

$$RB_{1,pos} = \left\lfloor \frac{1}{\alpha_1} \cdot RB_{1,pre} \right\rfloor \quad \text{Formula (14)}$$

$$RB_{2,pos} = \left\lfloor \frac{1}{\alpha_2} \cdot RB_{2,pre} \right\rfloor \quad \text{Formula (15)}$$

...

$$RB_{k,pos} = N_{sys}^{RB} - \sum_{i=1}^{k-1} RB_{i,pos} \quad \text{[Formula 16]}$$

A unit of $RB_{1,pos}$, $RB_{2,pos}$, ..., and $RB_{k,pos}$ is RB, $N_{sys}^{RB}$ is system bandwidth, $RB_{1,pre}$ is initial bandwidth allocated to the first user terminal, $RB_{2,pre}$ is initial bandwidth allocated to the second user terminal, and by analogy, $RB_{k,pre}$ is initial bandwidth allocated to the $k^{th}$ user terminal.

A second method is a process of reducing transmit power based on a frequency domain to calculate the expanded bandwidth of each user terminal. The process is used in an application scenario in which transmit power of a base station is reduced based on a baseband.

Step a: Calculate, according to initial bandwidth allocated to each user terminal and a modulation and coding scheme of each user terminal, or according to the initial bandwidth and spectrum efficiency of the terminal, additional bandwidth to be allocated to each user terminal.

Specifically, power reduction based on a baseband is an operation of reducing transmit power in the frequency domain, and it is unnecessary to meet a condition that reduction of demodulation threshold SINRs of all user terminals are the same. The baseband may differentiate users in the frequency domain, and scheduling is also performed in the frequency domain. A resource block RB is a minimum unit for frequency domain scheduling.

If there are k user terminals, $RB_{i,pre}$ is initial bandwidth allocated to the first user terminal, $RB_{i,pre}$ is initial bandwidth allocated to the $i^{th}$ user terminal, and by analogy, $RB_{k,pre}$ is initial bandwidth allocated to the $k^{th}$ user terminal. $MCS_{i,pre}$ is an initial MCS order allocated to the first user terminal, $MCS_{i,pre}$ is an initial MCS order allocated to the $i^{th}$ user terminal, and by analogy, $MCS_{k,pre}$ is an initial MCS order allocated to the $k^{th}$ user terminal. $SE_{1,pre}$ denotes spectrum efficiency of the first user terminal before bandwidth expansion is performed, $SE_{2,pre}$ denotes spectrum efficiency of the second user terminal before bandwidth expansion is performed, and $SE_{i,pre}$ denotes spectrum efficiency of the $i^{th}$ user terminal before bandwidth expansion is performed. A process of calculating additional bandwidth allocated to each user is separately expressed by formula (17-1), formula (18-1), and formula (19-2), or expressed by formula (17-2), formula (18-2), and formula (19-2).

$$RB_{1,add} = \left\lfloor \frac{RB_{1,pre} \times MCS_{1,pre}}{\sum_{i=1}^{k} RB_{i,pre} \times MCS_{i,pre}} \cdot \left(N_{sys}^{RB} - \sum_{i=1}^{k} RB_{i,pre}\right) \right\rfloor \quad \text{Formula (17-1)}$$

$$RB_{2,add} = \left\lfloor \frac{RB_{2,pre} \times MCS_{2,pre}}{\sum_{i=1}^{k} RB_{i,pre} \times MCS_{i,pre}} \times \left(N_{sys}^{RB} - \sum_{i=1}^{k} RB_{i,pre}\right) \right\rfloor \quad \text{Formula (18-1)}$$

...

$$RB_{k,add} = N_{sys}^{RB} - \sum_{i=1}^{k} RB_{i,pre} - \sum_{i=1}^{k-1} RB_{i,add} \quad \text{Formula (19-1)}$$

$$RB_{1,add} = \left\lfloor \frac{RB_{1,pre} \times SE_{1,pre}}{\sum_{i=1}^{k} RB_{i,pre} \times SE_{i,pre}} \cdot \left(N_{sys}^{RB} - \sum_{i=1}^{k} RB_{i,pre}\right) \right\rfloor \quad \text{Formula (17-2)}$$

-continued $$RB_{2,add} = \left\lfloor \frac{RB_{2,pre} \times SE_{2,pre}}{\sum_{i=1}^{k} RB_{i,pre} \times SE_{i,pre}} \times \left(N_{sys}^{RB} - \sum_{i=1}^{k} RB_{i,pre}\right) \right\rfloor \quad \text{Formula (18-2)}$$

...

$$RB_{k,add} = N_{sys}^{RB} - \sum_{i=1}^{k} RB_{i,pre} - \sum_{i=1}^{k-1} RB_{i,add} \quad \text{Formula (19-2)}$$

$RB_{1,add}$ is additional bandwidth to be allocated to the first user terminal, $RB_{2,add}$ is additional bandwidth to be allocated to the second user terminal, and by analogy, $RB_{k,add}$ is additional bandwidth to be allocated to the $k^{th}$ user terminal.

Step b: Calculate expanded bandwidth of each user terminal according to the additional bandwidth of each user.

Specifically, a sum of the additional bandwidth of each user and the initial bandwidth allocated to each user terminal is the expanded bandwidth of each user terminal, as expressed by formula (20), formula (21), and formula (22).

$$RB_{1,pos} = RB_{1,add} + RB_{1,pre} \quad \text{Formula (20)}$$

$$RB_{2,pos} = RB_{2,add} + RB_{2,pre} \quad \text{Formula (21)}$$

...

$$RB_{k,pos} = RB_{k,add} + RB_{k,pre} \quad \text{Formula (22)}$$

$RB_{1,add}$ is additional bandwidth to be allocated to the first user terminal, $RB_{2,add}$ is additional bandwidth to be allocated to the second user terminal, and by analogy, $RB_{k,add}$ is additional bandwidth to be allocated to the $k^{th}$ user terminal; $RB_{1,pre}$ is initial bandwidth allocated to the first user terminal, $RB_{2,pre}$ is initial bandwidth allocated to the second user terminal, and by analogy, $RB_{k,pre}$ is initial bandwidth allocated to the $k^{th}$ user terminal; $RB_{1,pos}$ is expanded bandwidth allocated to the first user terminal, $RB_{2,pos}$ is expanded bandwidth allocated to the second user terminal, and by analogy, $RB_{k,pos}$ is expanded bandwidth allocated to the $k^{th}$ user terminal.

Step c: Calculate a bandwidth expansion coefficient of each user terminal according to the initial bandwidth allocated to each user terminal and the expanded bandwidth of each user terminal.

Specifically, formula (14-1) and formula (15-1) for calculating the bandwidth expansion coefficient of each user terminal are obtained according to formula (14) and formula (15).

$$\alpha_1 = \left\lfloor \frac{RB_{1,pre}}{RB_{1,pos}} \right\rfloor \quad \text{Formula (14-1)}$$

...

$$\alpha_i = \left\lfloor \frac{RB_{i,pre}}{RB_{i,pos}} \right\rfloor \quad \text{Formula (15-1)}$$

$RB_{1,pre}$ is initial bandwidth allocated to the first user terminal, and by analogy, $RB_{i,pre}$ is initial bandwidth allocated to the $i^{th}$ user terminal; $RB_{1,pos}$ is expanded bandwidth allocated to the first user terminal, and by analogy, $RB_{i,pos}$ is expanded bandwidth allocated to the $i^{th}$ user terminal. $\alpha_1$ denotes a bandwidth expansion coefficient of the first user, and by analogy, $\alpha_i$ denotes a bandwidth expansion coefficient of the $i^{th}$ user, where a value of $\alpha_i$ ranges between 0 and 1, that is, $0 < \alpha_i \leq 1$. A third method is another process of calculating expanded terminal of each user terminal in the frequency domain. The process is used in an application scenario in which transmit power of a base station is reduced based on a baseband.

Step a: Calculate a proportionality coefficient of the initial bandwidth allocated to each user terminal to the system bandwidth according to the initial bandwidth allocated to each user terminal.

Specifically, the proportionality coefficient of the initial bandwidth allocated to each user terminal to the system bandwidth is denoted by $\beta_{PreRB}^1, \beta_{PreRB}^2, \ldots,$ and $\beta_{PreRB}^k$, where specific calculation processes thereof are expressed by formula (23), formula (24), and formula (25).

$$\beta_{PreRB}^1 = \frac{RB_{1,pre}}{N_{sys}^{RB}} \quad \text{Formula (23)}$$

$$\beta_{PreRB}^2 = \frac{RB_{2,pre}}{N_{sys}^{RB}} \quad \text{Formula (24)}$$

...

$$\beta_{PreRB}^k = \frac{RB_{k,pre}}{N_{sys}^{RB}} \quad \text{Formula (25)}$$

$N_{sys}^{RB}$ is corrected system bandwidth, $RB_{1,pre}$ is initial bandwidth allocated to the first user terminal, $RB_{2,pre}$ is initial bandwidth allocated to the second user terminal, and by analogy, $RB_{k,pre}$ is initial bandwidth allocated to the $k^{th}$ user terminal.

Step b: Form a cost function according to the proportionality coefficient of the initial bandwidth allocated to each user terminal to the system bandwidth, and spectrum efficiency and a signal to interference plus noise ratio (or a signal to noise ratio) of each user terminal.

Specifically, it is assumed that a proportionality coefficient of expanded bandwidth allocated to each user terminal to the system bandwidth is denoted by $\beta_{PosRB}^1, \beta_{PosRB}^2, \ldots,$ and $\beta_{PosRB}^k$, whose relationships with $\beta_{PreRB}^1, \beta_{PreRB}^2, \ldots,$ and $\beta_{PreRB}^k$ are expressed by formula (26), formula (27), and formula (28).

$$\frac{\beta_{PreRB}^1}{\beta_{PosRB}^1} = \alpha_1 \quad \text{Formula (26)}$$

$$\frac{\beta_{PreRB}^2}{\beta_{PosRB}^2} = \alpha_2 \quad \text{Formula (27)}$$

...

$$\frac{\beta_{PreRB}^k}{\beta_{PosRB}^k} = \alpha_k \quad \text{Formula (28)}$$

A cost function $\Gamma$ is formed according to the proportionality coefficient of the initial bandwidth allocated to each user terminal to the system bandwidth and the proportionality coefficient of the expanded bandwidth to the system bandwidth, and the cost function $\Gamma$ is expressed by formula (29).

$$\Gamma = \beta_{PreRB}^1 \cdot SINR(SE_{PreRB}^1) - \beta_{PosRB}^1 \cdot SINR(SE_{PosRB}^1) + \beta_{PreRB}^2 \cdot SINR(SE_{PreRB}^2) - \beta_{PosRB}^2 \cdot SINR(SE_{PosRB}^2) + \ldots + \beta_{PreRB}^k \cdot SINR(SE_{PreRB}^k) - \beta_{PosRB}^k \cdot SINR(SE_{PosRB}^k) \quad \text{Formula (29)}$$

$SE_{PreRB}^i$ denotes spectrum efficiency of the $i^{th}$ user terminal before bandwidth expansion is performed, $SE_{PosRB}^i$ denotes spectrum efficiency of the $i^{th}$ user terminal after bandwidth expansion is performed, and a relationship between the two is expressed by formula (9). In addition, SINR is y in formula (7), and $SE_{PreRB}$ or $SE_{PosRB}$ is x in formula (7).

Step c: Calculate a bandwidth expansion coefficient of each user terminal according to a formed cost function of all terminals in a current scheduling timeslot in a cell, a linear fitting function formed by spectrum efficiency and a signal to interference plus noise ratio (or a signal to noise ratio), and a constraint function formed by the expanded bandwidth of each user terminal and the system bandwidth.

Specifically, the cost function is expressed by formula (29), the linear fitting function is expressed by formula (7), and the constraint function is expressed by formula (13). Formula (30) is obtained according to the cost function, the linear fitting function, and the constraint function of each user terminal, where $\chi$ is a Lagrange multiplier.

$$\Psi = \beta_{PreRB}^1 \cdot SINR(SE_{PreRB}^1) - \beta_{PosRB}^1 \cdot SINR(SE_{PosRB}^1) + \\ \beta_{PreRB}^2 \cdot SINR(SE_{PreRB}^2) - \beta_{PosRB}^2 \cdot SINR(SE_{PosRB}^2) + \ldots + \\ \beta_{PreRB}^k \cdot SINR(SE_{PreRB}^k) - \beta_{PosRB}^k \cdot SINR(SE_{PosRB}^k) - \chi \cdot \\ \left( \frac{1}{\alpha_1} \cdot RB_{1,pre} + \frac{1}{\alpha_2} \cdot RB_{2,pre} + \ldots + \frac{1}{\alpha_K} \cdot RB_{k,pre} - N_{sys}^{RB} \right)$$

Formula (30)

A method for obtaining a conditional extreme value is implemented by using a Lagrange multiplier method in the prior art, and a maximum value of Γ is calculated according to formula (29) and formula (30), so as to obtain bandwidth expansion coefficients $\alpha_1, \alpha_2, \ldots, \alpha_k$.

Step d: Calculate the expanded bandwidth of each user terminal according to the bandwidth expansion coefficient of each user. A calculation process of this step is separately expressed by formula (14), formula (15), and formula (16), and detailed description is not provided herein again.

Step 104: Calculate, according to initial bandwidth and the expanded bandwidth of each terminal scheduled in the current timeslot and a linear fitting function and based on the time domain or the frequency domain, a transmit power reduction value corresponding to each terminal scheduled in a current timeslot after each terminal has undergone bandwidth expansion; and obtain a time domain system power reduction value, or a final frequency domain system power reduction value of each terminal according to the transmit power reduction value in the current scheduling timeslot or according to a result of statistics processing performed on the transmit power reduction value in the current scheduling timeslot and a transmit power reduction value of a historical scheduling timeslot.

Specifically, a transmit power reduction value $X_k$ corresponding to each user terminal after the user terminal has undergone bandwidth expansion is calculated according to bandwidth of each user terminal in the current scheduling timeslot before and after bandwidth expansion, and a linear fitting function formed by spectrum efficiency and a signal to interference plus noise ratio or formed by spectrum efficiency and a signal to noise ratio. A bandwidth expansion coefficient $\alpha_i$ of each user terminal is obtained according to the bandwidth of each user terminal in the current scheduling timeslot before and after bandwidth expansion, namely, the initial bandwidth and the expanded bandwidth. The transmit power reduction value $X_k$ corresponding to each user terminal after the user terminal has undergone bandwidth expansion is calculated according to the bandwidth expansion coefficient $\alpha_i$ of each user terminal and the linear fitting function. The calculation formula thereof is expressed by formula (31).

$$X_k = SINR(SE_{PreRB}^k) - SINR\left(\frac{1}{\alpha_1} \cdot SE_{PreRB}^k\right)$$

Formula (31)

In addition, because formula (31) is a linear function, a table lookup manner may also be used, as shown in Table 2. A power reduction value may be obtained by inputting spectrum efficiency SE and an expansion coefficient. Therefore, in the preset invention, a power reduction value may also be obtained by means of table lookup based on the expanded bandwidth and spectrum efficiency before expansion.

TABLE 2

| SE | Expansion Coefficient | | | | |
|---|---|---|---|---|---|
|  | 0.1 | 0.2 | 0.4 | 0.6 | 0.8 |
| 0.2 | 0.1(dBm) | 0.2(dBm) | 0.4(dBm) | 0.6(dBm) | 1.0(dBm) |
| 0.4 | 0.2(dBm) | 0.3(dBm) | 0.6(dBm) | 0.8(dBm) | 1.2(dBm) |
| 1.2 | 0.3(dBm) | 0.4(dBm) | 0.8(dBm) | 1.0(dBm) | 1.4(dBm) |
| 1.8 | 0.4(dBm) | 0.5(dBm) | 1.0(dBm) | 1.2(dBm) | 1.6(dBm) |
| 2.5 | 0.5(dBm) | 0.6(dBm) | 1.2(dBm) | 1.4(dBm) | 1.8(dBm) |
| 3.4 | 0.6(dBm) | 0.7(dBm) | 1.4(dBm) | 1.6(dBm) | 2.2(dBm) |
| 4.0 | 0.7(dBm) | 0.8(dBm) | 1.6(dBm) | 1.8(dBm) | 2.6(dBm) |
| 4.7 | 0.8(dBm) | 1.0(dBm) | 1.8(dBm) | 2.2(dBm) | 3.5(dBm) |
| 5.6 | 1.0(dBm) | 1.5(dBm) | 2.5(dBm) | 3.0(dBm) | 6.0(dBm) |

The step is the same with formula (7) and formula (8) that are used in step 103. However, there is a subscript k that denotes a user. The calculation process is performed based on each user. For power reduction in the time domain, a transmit power reduction value of each user is the same.

A second power value corresponding to each terminal scheduled in the current timeslot after the terminal has undergone bandwidth expansion is calculated according to the transmit power reduction value of each terminal scheduled in the current timeslot and a first power value corresponding to each terminal scheduled in the current timeslot before the terminal has undergone bandwidth expansion, where a calculation formula thereof is expressed by formula (32); a final transmit power reduction value $X_{k,down}(i)$ of each terminal scheduled in the current timeslot is calculated, where a calculation formula thereof is expressed by formula (33) to formula (35).

$$10 \cdot lg\left(\frac{P_{pre,k}}{P_{pos,k}}\right) = X_k (dB)$$

Formula (32)

$P_{pre,k}$ is the first power value corresponding to each terminal scheduled in the current timeslot before the terminal has undergone bandwidth expansion, and $P_{pos,k}$ is the second power value corresponding to each terminal scheduled in the current timeslot after the terminal has undergone bandwidth expansion.

In addition, $P_{pos,k}(i)$, i=0, 1, 2 ... after power reduction is performed is obtained by calculation according to formula (32), where i is an i+1$^{th}$ scheduling timeslot corresponding to a series of $X_k(i)$. When calculation of bandwidth expansion is not started in the i+1$^{th}$ scheduling timeslot, $X_k(i)$=0. Statistics processing may be performed in a manner such as alpha filtering, kalman filtering, and moving average filtering. For example, alpha filtering is used, and then a process of calculating final transmit power reduction of a user terminal k is expressed by formula (5) and formula (6).

$$\hat{X}_k(0) = X_k(0) \qquad \text{Formula (33)}$$

$$\hat{X}_k(i) = \alpha \cdot X_k(i) + (1-\alpha) \cdot \hat{X}_k(i-1) \qquad \text{Formula (34)}$$

$$X_{k,down}(i) = \hat{X}_k(i) \qquad \text{Formula (35)}$$

In the time domain, a time domain system power reduction value is obtained according to the transmit power reduction value in the current scheduling timeslot or according to a result of statistics processing performed on the transmit power reduction value in the current scheduling timeslot and a transmit power reduction value in a historical scheduling timeslot.

In the frequency domain, a final frequency domain system power reduction value is obtained according to the transmit power reduction value of each terminal in the current scheduling timeslot or according to a result of statistics processing performed on the transmit power reduction value in the current scheduling timeslot and a transmit power reduction value in a historical scheduling timeslot.

Step 105: When the time domain system power reduction value $X_{k,down}(i)$ is not less than a preset threshold, reduce transmit power of a base station based on the time domain; or when a final frequency domain transmit power reduction value $X_{k,down}(i)$ of each terminal is not less than a preset threshold, reduce transmit power of a base station based on the frequency domain.

Specifically, when the time domain system power reduction value $X_{k,down}(i)$ is not less than preset threshold power $X_{k,Thr}$, the transmit power of the base station is reduced by using at least one adjustment manner of directly instructing a radio frequency processing unit or device to adjust radio frequency transmit power, adjusting a configuration of pilot reference signal power, adjusting a parameter related to a difference between power of data resources and the pilot reference signal power, and reducing baseband digital power of a data symbol in the time domain. That is, a first power value is adjusted to a second power value.

When the final frequency transmit power reduction value $X_{k,down}(i)$ of each terminal is not less than preset threshold power $X_{k,Thr}$, the transmit power of the base station is reduced by using at least one adjustment manner of adjusting pilot reference signal power and a parameter related to a ratio of power of data resources to the pilot reference signal power, and reducing baseband digital power of frequency domain scheduling resources of the terminal.

Reducing the transmit power of the base station may be triggered periodically; the period is one or more timeslots; when the period is multiple timeslots, power increase or decrease is performed by executing event triggering, so as to adjust the transmit power of the base station.

Because a process of reducing power in the frequency domain is started only when $X_{k,down}(i) \geq X_{k,Thr}$, considering an implementation effect, power adjustment may not be performed at a level of each scheduling timeslot, for example, power adjustment may be performed at an interval of P timeslots. To avoid a situation that a service requirement cannot be met in P timeslots after power adjustment, a power increase or decrease operation triggered by time may be added. For example, when there is a case of at least one of that a usage ratio of a Radio Link Control layer (Radio Link Control, RLC) cache or a Packet Data Convergence Protocol (Packet Data Convergence Protocol, PDCP) cache reaches a preset threshold or a packet loss rate thereof exceeds a preset threshold, and that a Transmission Control Protocol (Transmission Control Protocol, TCP) packet loss rate thereof exceeds a preset threshold, an operation of improving transmit power in the time domain is triggered by an event. For example, power is improved in an equal step manner, or power increase or decrease is performed fast first and then slowly, so that cache balance may be maintained, thereby avoiding packet loss. For LTE, power adjustment at a user level may be achieved by $P_A$.

In addition, an embodiment of the present invention further provides another method for reducing transmit power in a time domain. The method is specifically: calculating remaining system bandwidth in step 102 according to initial bandwidth of all terminals scheduled in a current timeslot; when the remaining system bandwidth is greater than preset threshold bandwidth, calculating a transmit power reduction value corresponding to each terminal scheduled in the current timeslot after each terminal has undergone bandwidth expansion. However, herein, the transmit power reduction value corresponding to each terminal scheduled in the current timeslot after the terminal has undergone bandwidth expansion does not need to be directly calculated; instead, the transmit power reduction value corresponding to each terminal scheduled in the current timeslot after the terminal has undergone bandwidth expansion is directly acquired from a table by using a table lookup method, as shown in Table 3. Other processes are the same with those of reducing transmit power based on the time domain, and detailed description is not provided herein again.

TABLE 3

| Remaining Bandwidth/ System Bandwidth | Reduced Transmit Power X (dB) |
|---|---|
| 0.2 | 0.5 |
| 0.4 | 1.0 |
| 0.6 | 3.0 |
| 0.8 | 6.0 |

Therefore, in the method for reducing transmit power provided in this embodiment of the present invention, initial bandwidth is allocated to each user terminal according to quality of service requirement information of a user and channel quality indication information, and then remaining system bandwidth is calculated; when the remaining system bandwidth is greater than preset threshold bandwidth, expanded bandwidth of each user terminal is calculated in a time domain or a frequency domain by using three calculation methods, where the calculated expanded bandwidth, namely, expanded bandwidth, is greater than or equal to the initial bandwidth; and finally, the expanded bandwidth is allocated to each user terminal, thereby greatly reducing transmit power of a base station in a bandwidth expansion manner.

Figure 2:
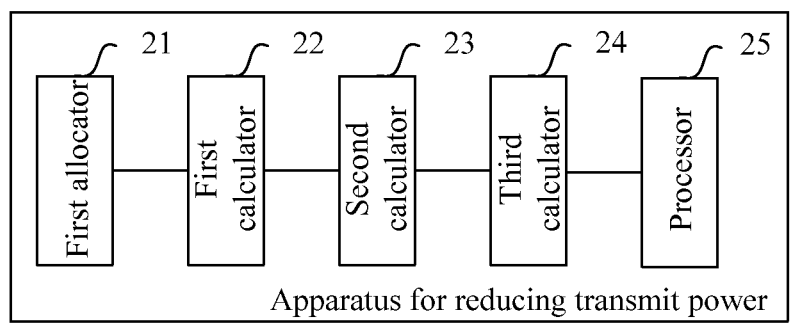
FIG. 2 is a schematic diagram of an apparatus for reducing transmit power according to a second embodiment of the present invention.

FIG. 2 is a schematic diagram of an apparatus for reducing transmit power according to a second embodiment of the present invention. The apparatus is a hardware device that is capable of executing the method for reducing transmit power according to the first embodiment of the present invention, for example, a base station. As shown in the figure, the apparatus for reducing transmit power according to this embodiment specifically includes a first allocator 21, a first calculator 22, a second calculator 23, a third allocator 24, and a processor 25.

The first allocator 21 allocates, according to at least one type of information among quality of service QoS information of a user, historical scheduling information, and channel quality information, initial bandwidth to all terminals scheduled in a current timeslot in a cell, and transmits the initial bandwidth to the first calculator 22; the first calculator 22 is configured to receive the initial bandwidth from the first allocator, calculate remaining bandwidth in the current timeslot according to the initial bandwidth of all the terminals scheduled in the current timeslot, obtain remaining system bandwidth according to the remaining bandwidth in the current timeslot, or after statistics processing is performed on the remaining bandwidth in the current timeslot and remaining bandwidth in a historical timeslot, and transmit the remaining system bandwidth to the second calculator 23; the second calculator 23 is configured to receive the remaining system bandwidth from the first calculator 22, and if the remaining system bandwidth is greater than preset threshold bandwidth, reduce transmit power based on a time domain or a frequency domain to calculate expanded bandwidth of the terminal, and transmit the expanded bandwidth to a third calculator 24; the third calculator 24 is configured to calculate, according to initial bandwidth and the expanded bandwidth of each terminal scheduled in the current timeslot and a linear fitting function and based on the time domain or the frequency domain, a transmit power reduction value corresponding to each terminal in a current scheduling timeslot after each terminal has undergone bandwidth expansion, obtain a time domain system power reduction value, or a final frequency domain system power reduction value of each terminal according to the transmit power reduction value in the current scheduling timeslot or according to a result of statistics processing performed on the transmit power reduction value in the current scheduling timeslot and a transmit power reduction value in a historical scheduling timeslot, and transmit the time domain system power reduction value or the final frequency domain system power reduction value of each terminal to the processor 25; and the processor 25 is configured to receive the final frequency domain system power reduction value of each terminal from the third calculator, when the time domain system power reduction value is not less than a preset threshold, reduce transmit power of a base station based on the time domain, or when a final frequency domain transmit power reduction value of each terminal is not less than a preset threshold, reduce transmit power of a base station based on the frequency domain, and allocate the expanded bandwidth to the terminal.

Preferably, the second calculator 23, which is in the apparatus for reducing transmit power according to this embodiment, is specifically configured to calculate, according to spectrum efficiency of a terminal, a linear fitting function formed by spectrum efficiency and a signal to interference plus noise ratio or formed by spectrum efficiency and a signal to noise ratio, and a constraint function formed by that a sum of expanded bandwidth of all the terminals scheduled in the current timeslot is equal to $\gamma$ times of the system bandwidth, a bandwidth expansion coefficient of each terminal scheduled in the current timeslot, where $\gamma$ is greater than 0 and not greater than 1; and calculate the expanded bandwidth according to the bandwidth expansion coefficient of the terminal.

Specifically, a process of calculating, by the second calculator 23, expanded bandwidth of each user terminal in the time domain is used in an application scenario in which transmit power of a base station is reduced in an intermediate radio frequency. Firstly, linear fitting is performed by using spectrum efficiency and a demodulation threshold SINR to obtain a linear fitting formula, namely, a linear fitting function, as expressed by formula (5). Because a power reduction operation is performed in an intermediate radio frequency, different users cannot be differentiated in the time domain; however, for a scenario of OFDMA multiple access, it is required to ensure that demodulation thresholds reduced by means of bandwidth expansion are the same for all users, as expressed by formula (8). In this embodiment of the present invention, it is defined that $\alpha_i$ denotes a bandwidth expansion coefficient of an $i^{th}$ user, where a value of $\alpha_i$ ranges between 0 and 1, that is, $0<\alpha_i\leq 1$. $SE_{PreRB}{}^i$ denotes spectrum efficiency of the $i^{th}$ user terminal before bandwidth expansion is performed, and $SE_{PosRB}{}^i$ denotes spectrum efficiency of the $i^{th}$ user terminal after bandwidth expansion is performed. A relationship between the spectrum efficiency of the $i^{th}$ user terminal before bandwidth expansion is performed and the spectrum efficiency of the $i^{th}$ user terminal after bandwidth expansion is performed is expressed by formula (9); a formula of a relationship between $\alpha_i$ and $\alpha_1$ is obtained by a series of calculation, as expressed by formula (12). Finally, the bandwidth expansion coefficient $\alpha_i$ of each user is obtained by using the constraint function of the system bandwidth, which is expressed by formula (13-1) or (13-2).

Preferably, the second calculator 23 in a bandwidth expansion apparatus provided in this embodiment is specifically configured to calculate, according to initial bandwidth of a terminal and a modulation and coding manner of the terminal, or according to the initial bandwidth and the spectrum efficiency of the terminal, additional bandwidth to be allocated to the terminal; calculate the expanded bandwidth according to the additional bandwidth; and calculate a bandwidth expansion coefficient of each terminal according to the initial bandwidth and the expanded bandwidth of each terminal scheduled in the current timeslot.

Specifically, another process of calculating, by the second calculator 23, expanded bandwidth of each user terminal in the frequency domain is used in an application scenario in which transmit power of a base station is reduced based on a baseband. Power reduction based on a baseband is an operation of reducing transmit power in the frequency domain, and it is unnecessary to meet a condition that reduction of demodulation threshold SINRs of all user terminals are the same. The baseband may differentiate users in the frequency domain, and scheduling is also performed in the frequency domain. A resource block RB is a minimum unit for frequency domain scheduling. If there are k user terminals, calculation processes for the additional bandwidth allocated to each user are respectively expressed by formula (17), formula (18), and formula (19). Then, a sum of the additional bandwidth of each user and the initial bandwidth allocated to each user terminal is the expanded bandwidth of each user terminal, as expressed by formula (20), formula (21), and formula (22).

Preferably, the second calculator 23 in a bandwidth expansion apparatus provided in this embodiment is specifically configured to calculate a proportionality coefficient of the initial bandwidth to the system bandwidth according to the initial bandwidth; form a cost function of the terminal according to the proportionality coefficient of the initial bandwidth to the system bandwidth, spectrum efficiency of the terminal, and a signal to interference plus noise ratio; calculate a bandwidth expansion coefficient of the terminal according to the cost function of the terminal, a linear fitting function formed by the spectrum efficiency of the terminal and a signal to interference plus noise ratio, and a constraint function that a sum of expanded bandwidth of the terminals is equal to the system bandwidth; calculate a bandwidth expansion coefficient of the terminal, and calculate the expanded bandwidth according to the bandwidth expansion coefficient of the terminal.

Specifically, another process of calculating, by the second calculator 23, expanded bandwidth of each user terminal in the frequency domain is used in an application scenario in which transmit power of a base station is reduced based on a baseband. The proportionality coefficient of the initial bandwidth allocated to each user terminal to the system bandwidth is denoted by $\beta_{PreRB}^1$, $\beta_{PreRB}^2$, ..., and $\beta_{PreRB}^k$, where specific calculation processes thereof are expressed by formula (23), formula (24), and formula (25). It is assumed that a proportionality coefficient of expanded bandwidth allocated to each user terminal to the system bandwidth is denoted by $\beta_{PosRB}^1$, $\beta_{PosRB}^2$, ..., and $\beta_{PosRB}^k$, whose relationships with $\beta_{PreRB}^1$, $\beta_{PreRB}^2$, ..., and $\beta_{PreRB}^k$ are expressed by formula (26), formula (27), and formula (28). A cost function $\Gamma$ is formed according to the proportionality coefficient of the initial bandwidth allocated to each user terminal to the system bandwidth and the proportionality coefficient of the expanded bandwidth to the system bandwidth, and the cost function $\Gamma$ is expressed by formula (29). The linear fitting function is expressed by formula (7), and the constraint function is expressed by formula (13-1) or (13-2). Formula (30) is obtained according to the cost function, the linear fitting function, and the constraint function of each user terminal. By using a Lagrange method for obtaining an extreme value in the prior art, a maximum value of $\Gamma$ is calculated according to formula (29) and formula (30), so as to obtain bandwidth expansion coefficients $\alpha_1, \alpha_2, \ldots, \alpha_k$.

Preferably, the third calculator 24 is specifically configured to find a time domain transmit power reduction value in the current scheduling timeslot according to a preset ratio of the remaining bandwidth to the system bandwidth and by using a table of a correspondence between the ratio and a transmit power reduction value in the current scheduling timeslot; or find a frequency domain transmit power reduction value in the current scheduling timeslot according to a preset table of correspondences among a bandwidth expansion coefficient, spectrum efficiency, and a transmit power reduction value in the current scheduling timeslot, where the time domain transmit power reduction value in the current scheduling timeslot or the frequency domain transmit power reduction value in the current scheduling timeslot is the transmit power reduction value in the current scheduling timeslot.

Preferably, the third calculator 24 is further specifically configured to find a time domain transmit power reduction value in the current scheduling timeslot according to a preset ratio of the remaining bandwidth to the system bandwidth and by using a table of a correspondence between the ratio and a transmit power reduction value in the current scheduling timeslot; or find a frequency domain transmit power reduction value in the current scheduling timeslot according to a preset table of correspondences between a bandwidth expansion coefficient, spectrum efficiency, and a transmit power reduction value in the current scheduling timeslot; where the time domain transmit power reduction value in the current scheduling timeslot or the frequency domain transmit power reduction value in the current scheduling timeslot is the transmit power reduction value in the current scheduling timeslot.

Preferably, the processor 25 is specifically configured to reduce the transmit power of the base station based on the time domain and by using at least one adjustment manner of directly instructing a radio frequency processing unit or device to adjust radio frequency transmit power, adjusting a configuration of pilot reference signal power, adjusting a parameter related to a difference between power of data resources and the pilot reference signal power, and reducing baseband digital power of a data symbol in the time domain.

Preferably, the processor 25 is specifically configured to reduce the transmit power of the base station based on the frequency domain and by using at least one adjustment manner of adjusting pilot reference signal power and a ratio relationship between power of data resources and the pilot reference signal power, and reducing baseband digital power of frequency domain scheduling resources of the terminal.

Reducing the transmit power of the base station in the processor 25 may be periodically triggered; the period is one or more timeslots; when the period is multiple timeslots, a manner of triggering by an event may be added to adjust the transmit power of the base station; the event may be at least one of that a cache usage ratio of a Radio Link Control layer RLC layer exceeds a certain threshold or a packet loss rate thereof exceeds a preset threshold, that a cache usage ratio of a Packet Data Convergence Protocol PDCP layer exceeds a preset threshold or a packet loss rate thereof exceeds a preset threshold, and that a Transmission Control Protocol TCP packet loss rate exceeds a preset threshold.

Therefore, according to the bandwidth expansion apparatus provided in this embodiment of the present invention, initial bandwidth is allocated, by using a first allocator, to each user terminal according to quality of service requirement information of a user and channel quality indication information; then remaining system bandwidth is calculated by using a first calculator; when the remaining system bandwidth is greater than preset threshold bandwidth, expanded bandwidth of each user terminal is calculated in a time domain or a frequency domain by using a second calculator and by using three calculation methods, where the calculated expanded bandwidth, namely, expanded bandwidth, is greater than or equal to the initial bandwidth; and finally, the expanded bandwidth is allocated to each user terminal by using a second allocator, thereby greatly reducing transmit power of a base station by using a bandwidth expansion manner.

A person skilled in the art may be further aware that, with reference to the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

Steps of methods or algorithms described in the embodiments disclosed in this specification may be implemented by hardware, a software module executed by a processor, or a combination thereof. The software module may be configured in a random access memory (RAM), memory, a read-only memory (ROM), an electrically programmable ROM, an electrically erasable programmable ROM, a register, a hard disk, a removable disk, a CD-ROM, or a storage medium in any other forms well-known in the art.

In the foregoing specific implementations, the objective, technical solutions, and benefits of the present invention are further described in detail. It should be understood that the foregoing descriptions are merely specific implementations of the present invention, but are not intended to limit the protection scope of the present invention. Any modification, equivalent replacement, or improvement made without departing from the spirit and principle of the present invention should fall within the protection scope of the present invention.

What is claimed is:

1. A method for reducing transmit power, the method comprising:

allocating an initial bandwidth to all terminals scheduled in a current timeslot in a cell, the initial bandwidth being allocated according to at least one type of information among quality of service (QoS) information of a user, historical scheduling information, and channel quality information;

calculating remaining bandwidth in the current timeslot according to the initial bandwidth of all the terminals scheduled in the current timeslot;

obtaining remaining system bandwidth according to the remaining system bandwidth in the current timeslot, or after statistics processing is performed on the remaining system bandwidth in the current timeslot and remaining bandwidth in a historical timeslot;

when the remaining system bandwidth is greater than preset threshold bandwidth, reducing transmit power based on a time domain or a frequency domain to calculate expanded bandwidth of each terminal scheduled in the current timeslot;

calculating, according to the initial bandwidth and the expanded bandwidth of each terminal scheduled in the current timeslot and a linear fitting function and based on the time domain or the frequency domain, a transmit power reduction value corresponding to each terminal in a current scheduling timeslot after each terminal has undergone bandwidth expansion;

obtaining a time domain system power reduction value, or a final frequency domain system power reduction value of each terminal according to the transmit power reduction value in the current scheduling timeslot or according to a result of statistics processing performed on the transmit power reduction value in the current scheduling timeslot and a transmit power reduction value of a historical scheduling timeslot; and when the time domain system power reduction value is not less than a preset threshold, reducing transmit power of a base station based on the time domain, or when a final frequency domain transmit power reduction value of each terminal is not less than a preset threshold, reducing transmit power of a base station based on the frequency domain.

2. The method according to claim 1, wherein reducing the transmit power based on the time domain to calculate the expanded bandwidth of each terminal scheduled in the current timeslot comprises:

calculating, according to spectrum efficiency of a terminal, a linear fitting function formed by spectrum efficiency and a signal to interference plus noise ratio or formed by spectrum efficiency and a signal to noise ratio, and a constraint function formed by that a sum of expanded bandwidth of all the terminals scheduled in the current timeslot is equal to $\gamma$ times the system bandwidth, a bandwidth expansion coefficient of each terminal scheduled in the current timeslot, wherein $\gamma$ is greater than 0 and not greater than 1; and calculating the expanded bandwidth of each terminal according to the bandwidth expansion coefficient of each terminal.

3. The method according to claim 1, wherein the reducing transmit power based on the frequency domain to calculate the expanded bandwidth of each terminal scheduled in the current timeslot comprises:

calculating, according to the initial bandwidth of the terminal scheduled in the current timeslot and a modulation and coding scheme, or according to the initial bandwidth and spectrum efficiency of the terminal, additional bandwidth to be allocated to each terminal scheduled in the current timeslot;

calculating, according to the additional bandwidth of each terminal, the expanded bandwidth of each terminal scheduled in the current timeslot; and calculating a bandwidth expansion coefficient of each terminal according to the initial bandwidth and the expanded bandwidth of each terminal scheduled in the current timeslot.

4. The method according to claim 1, wherein reducing the transmit power based on the frequency domain to calculate the expanded bandwidth of each terminal scheduled in the current timeslot comprises:

calculating a proportionality coefficient of the initial bandwidth of each terminal scheduled in the current timeslot to the system bandwidth according to the initial bandwidth of each terminal scheduled in the current timeslot;

forming, according to the proportionality coefficient of the initial bandwidth of each terminal scheduled in the current timeslot to the system bandwidth, spectrum efficiency of the terminal, and spectrum efficiency and a signal to interference plus noise ratio, or spectrum efficiency and a signal to noise ratio, a cost function for a sum of reduced transmit power of the terminal scheduled in the current timeslot;

calculating, according to the cost function, a linear fitting function formed by the spectrum efficiency and a signal to interference plus noise ratio or formed by the spectrum efficiency and a signal to noise ratio, and a constraint function that a sum of expanded bandwidth of the terminals is equal to $\gamma$ times the system bandwidth, a bandwidth expansion coefficient of the terminal, wherein $\gamma$ is greater than 0 and not greater than 1; and calculating, according to the bandwidth expansion coefficient of the terminal, the expanded bandwidth of each terminal scheduled in the current timeslot.

5. The method according to claim 1, wherein calculating the transmit power reduction value corresponding to the terminal in the current scheduling timeslot after the terminal has undergone bandwidth expansion comprises calculating a time domain transmit power reduction value in the current scheduling timeslot according to a bandwidth expansion coefficient of each terminal, spectrum efficiency of the terminal before expansion, and a linear fitting function; or calculating a frequency domain transmit power reduction value in the current scheduling timeslot according to a bandwidth expansion coefficient of each terminal, spectrum efficiency of the terminal before expansion, and the linear fitting function, wherein the linear fitting function is formed by spectrum efficiency and a signal to interference plus noise ratio or formed by spectrum efficiency and a signal to noise ratio and wherein the time domain transmit power reduction value in the current scheduling timeslot or the frequency domain transmit power reduction value in the current scheduling timeslot is the transmit power reduction value in the current scheduling timeslot.

6. The method according to claim 1, wherein calculating the transmit power reduction value corresponding to the terminal in the current scheduling timeslot after the terminal has undergone bandwidth expansion comprises finding, according to a preset ratio of the remaining bandwidth to the system bandwidth, a time domain transmit power reduction value in the current scheduling timeslot by using a table of a correspondence between the ratio and a transmit power reduction value in the current scheduling timeslot; or finding a frequency domain transmit power reduction value in the current scheduling timeslot according to a preset table of correspondences among a bandwidth expansion coefficient, spectrum efficiency, and a transmit power reduction value in the current scheduling timeslot, wherein the time domain transmit power reduction value in the current scheduling timeslot or the frequency domain transmit power reduction value in the current scheduling timeslot is the transmit power reduction value in the current scheduling timeslot.

7. The method according to claim 1, wherein reducing the transmit power of the base station based on the time domain comprises reducing the transmit power of the base station by using at least one adjustment manner of directly instructing a radio frequency processing unit or device to adjust radio frequency transmit power, adjusting a configuration of pilot reference signal power, adjusting a parameter related to a difference between power of data resources and the pilot reference signal power, and reducing baseband digital power of a data symbol in the time domain.

8. The method according to claim 7, wherein reducing the transmit power of the base station may be triggered periodically at a period of one or more timeslots;
wherein, when the period is multiple timeslots, a manner of triggering by an event is added to adjust the transmit power of the base station;
wherein the event is at least one a cache usage ratio of a Radio Link Control layer (RLC) layer exceeding a certain threshold or a packet loss rate thereof exceeding a preset threshold or a cache usage ratio of a Packet Data Convergence Protocol (PDCP) layer exceeding a preset threshold or a packet loss rate thereof exceeds a preset threshold, or a Transmission Control Protocol (TCP) packet loss rate exceeding a preset threshold.

9. The method according to claim 1, wherein reducing the transmit power of the base station based on the frequency domain comprises reducing the transmit power of the base station by using at least one adjustment manner of adjusting pilot reference signal power and a parameter related to a ratio of power of data resources to the pilot reference signal power, and reducing baseband digital power of frequency domain scheduling resources of the terminal.

10. The method according to claim 1, wherein the initial bandwidth is less than or equal to the expanded bandwidth.

11. An apparatus comprising:
a processor; and
a computer-readable storage medium storing a program to be executed by the processor, the program including instructions for:
allocating an initial bandwidth to all terminals scheduled in a current timeslot in a cell, the initial bandwidth being allocated according to at least one type of information among quality of service (QoS) information of a user, historical scheduling information, and channel quality information;
calculating remaining bandwidth in the current timeslot according to the initial bandwidth of all the terminals scheduled in the current timeslot;
obtaining remaining system bandwidth according to the remaining system bandwidth in the current timeslot, or after statistics processing is performed on the remaining system bandwidth in the current timeslot and remaining bandwidth in a historical timeslot;
when the remaining system bandwidth is greater than preset threshold bandwidth, reducing transmit power based on a time domain or a frequency domain to calculate expanded bandwidth of the terminal;
calculating, according to initial bandwidth and expanded bandwidth of each terminal scheduled in the current timeslot and a linear fitting function and based on the time domain or the frequency domain, a transmit power reduction value corresponding to each terminal in a current scheduling timeslot after each terminal has undergone bandwidth expansion; obtain a time domain system power reduction value or a final frequency domain system power reduction value of each terminal according to the transmit power reduction value in the current scheduling timeslot or according to a result of statistics processing performed on the transmit power reduction value in the current scheduling timeslot and a transmit power reduction value in a historical scheduling timeslot; and
when the time domain system power reduction value is not less than a preset threshold, reducing transmit power of a base station based on the time domain or when a final frequency domain transmit power reduction value of each terminal is not less than a preset threshold, reducing transmit power of a base station based on the frequency domain, and allocate the expanded bandwidth to the terminal.

12. The apparatus for reducing transmit power according to claim 11, wherein the program includes further instructions for calculating, according to spectrum efficiency of the terminal, a linear fitting function formed by spectrum efficiency and a signal to interference plus noise ratio or formed by spectrum efficiency and a signal to noise ratio, and a constraint function formed by that a sum of expanded bandwidth of all terminals scheduled in the current timeslot is equal to $\gamma$ times the system bandwidth, a bandwidth expansion coefficient of each terminal scheduled in the current timeslot, wherein $\gamma$ is greater than 0 and not greater than 1; and calculate the expanded bandwidth according to the bandwidth expansion coefficient of the terminal.

13. The apparatus for reducing transmit power according to claim 11, wherein the program includes further instructions for calculating, according to initial bandwidth of the terminal and a modulation and coding scheme of the terminal, or according to the initial bandwidth and spectrum efficiency of the terminal, additional bandwidth to be allocated to the terminal, calculating the expanded bandwidth according to the additional bandwidth, and calculating a bandwidth expansion coefficient of each terminal according to the initial bandwidth and the expanded bandwidth of each terminal scheduled in the current timeslot.

14. The apparatus for reducing transmit power according to claim 11, wherein the program includes further instructions for
calculating a proportionality coefficient of the initial bandwidth to the system bandwidth according to the initial bandwidth;
forming a cost function of the terminal according to the proportionality coefficient of the initial bandwidth to the system bandwidth, spectrum efficiency of the terminal, and a signal to interference plus noise ratio;
calculating a bandwidth expansion coefficient of the terminal according to the cost function of the terminal, a linear fitting function formed by the spectrum efficiency of the terminal and a signal to interference plus noise ratio, and a constraint function that a sum of expanded bandwidth of the terminals is equal to the system bandwidth;
calculating a bandwidth expansion coefficient of the terminal; and calculating the expanded bandwidth according to the bandwidth expansion coefficient of the terminal.

15. The apparatus for reducing transmit power according to claim 11, wherein the program includes further instructions for calculating a time domain transmit power reduction value in the current scheduling timeslot according to a bandwidth expansion coefficient of each terminal, spectrum efficiency of the terminal before expansion, and a linear fitting function; or calculating a frequency domain transmit power reduction value in the current scheduling timeslot according to a bandwidth expansion coefficient of each terminal, spectrum efficiency of the terminal before expansion, and the linear fitting function, wherein the linear fitting function is formed by spectrum efficiency and a signal to interference plus noise ratio or formed by spectrum efficiency and a signal to noise ratio; and the time domain transmit power reduction value in the current scheduling timeslot or the frequency domain transmit power reduction value in the current scheduling timeslot is the transmit power reduction value in the current scheduling timeslot.

16. The apparatus for reducing transmit power according to claim 11, wherein the program includes further instructions for finding a time domain transmit power reduction value in the current scheduling timeslot according to a preset ratio of the remaining bandwidth to the system bandwidth and by using a table of a correspondence between the ratio and a transmit power reduction value in the current scheduling timeslot; or finding a frequency domain transmit power reduction value in the current scheduling timeslot according to a preset table of correspondences among a bandwidth expansion coefficient, spectrum efficiency, and a transmit power reduction value in the current scheduling timeslot, wherein the time domain transmit power reduction value in the current scheduling timeslot or the frequency domain transmit power reduction value in the current scheduling timeslot is the transmit power reduction value in the current scheduling timeslot.

17. The apparatus for reducing transmit power according to claim 11, wherein the program includes further instructions for reducing the transmit power of the base station based on the time domain and by using at least one adjustment manner of directly instructing a radio frequency processing unit or device to adjust radio frequency transmit power, adjusting a configuration of pilot reference signal power, adjusting a parameter related to a difference between power of data resources and the pilot reference signal power, and reducing baseband digital power of a data symbol in the time domain.

18. The apparatus for reducing transmit power according to claim 11, wherein the program includes further instructions for reducing the transmit power of the base station based on the frequency domain and by using at least one adjustment manner of adjusting pilot reference signal power and a ratio relationship between power of data scheduling resources and the pilot reference signal power, and reducing baseband digital power of frequency domain scheduling resources of the terminal.

19. The apparatus for reducing transmit power according to claim 11, wherein reducing the transmit power of the base station may be periodically triggered in the processor at a period of one or more timeslots;
   wherein, when the period is multiple timeslots, a manner of triggering by an event may be added to adjust the transmit power of the base station; and
   wherein the event may be at least one of that a cache usage ratio of a Radio Link Control layer RLC layer exceeds a certain threshold or a packet loss rate thereof exceeds a preset threshold, that a cache usage ratio of a Packet Data Convergence Protocol PDCP layer exceeds a preset threshold or a packet loss rate thereof exceeds a preset threshold, and that a Transmission Control Protocol TCP packet loss rate exceeds a preset threshold.

20. The apparatus for reducing transmit power according to claim 11, wherein the initial bandwidth is less than or equal to the expanded bandwidth.

\* \* \* \* \*